United States Patent [19]
Korson

[11] Patent Number: 5,909,861
[45] Date of Patent: Jun. 8, 1999

[54] HOSE SUPPORT WITH TELESCOPING TUBE

[76] Inventor: Albert Korson, P.O. Box 658, Suttons Bay, Mich. 49682

[21] Appl. No.: 08/889,820

[22] Filed: Jul. 8, 1997

[51] Int. Cl.[6] .................................................. A47G 29/00
[52] U.S. Cl. .............................. 248/80; 248/157; 248/75; 248/161; 242/397.2
[58] Field of Search .............................. 248/80, 127, 157, 248/404, 75, 55, 49, 51; 242/397.2; 384/49; 280/420, 421, 422

[56] References Cited

U.S. PATENT DOCUMENTS

| | | |
|---|---|---|
| 821,704 | 5/1906 | Conway ...................................... 384/49 |
| 2,733,033 | 1/1956 | Gunderson . |
| 2,879,020 | 3/1959 | Wheeler . |
| 2,948,450 | 8/1960 | Dobrikin . |
| 2,978,217 | 4/1961 | Gunderson . |
| 2,984,445 | 5/1961 | Dobrikin . |
| 3,208,769 | 9/1965 | Onori . |
| 3,279,823 | 10/1966 | Thouvenelle et al. . |
| 3,407,907 | 10/1968 | Schmid . |
| 3,420,546 | 1/1969 | Jasovsky . |
| 3,628,811 | 12/1971 | Rivers ....................................... 280/422 |
| 3,650,545 | 3/1972 | Freed . |
| 3,965,802 | 6/1976 | Jacobs . |
| 4,076,272 | 2/1978 | Penton . |
| 4,238,096 | 12/1980 | Dvoraschek . |
| 4,705,491 | 11/1987 | Andersson ............................... 464/167 |

FOREIGN PATENT DOCUMENTS 1256996  9/1986  U.S.S.R. ................. 280/422

*Primary Examiner*—Leslie A. Braun
*Assistant Examiner*—Gwendolyn Baxter
*Attorney, Agent, or Firm*—Dykema Gossett PLLC

[57] ABSTRACT

A hose support for hoses extending from a truck tractor to a truck trailer includes a U-shaped tube, a plurality of balls, a weight, a telescoping member, a hose engagement feature, and a mounting feature. The U-shaped tube has a central axis and two upwardly directed arms. The plurality of balls are disposed within the tube. The weight is slidably disposed in a first arm of the U-shaped tube, and acts against the balls. The telescoping tube is slidably disposed in a second arm. The hose engagement feature is disposed on the telescoping tube. The mounting feature is connected to the U-shaped tube. The weight, acting against the balls, biases the telescoping member upward.

9 Claims, 3 Drawing Sheets

HOSE SUPPORT WITH TELESCOPING TUBE

FIELD OF THE INVENTION

This invention relates to hose supports for use with hoses and cables extending between truck tractors and trailers.

BACKGROUND OF THE INVENTION

Truck tractors have hoses and electrical cables which extend to trailers for operating trailer brakes, lights and other equipment. The length of the hoses and cables needed to connect the tractor with the trailer varies with the relative angular orientation of the tractor and trailer. For example, the distance between the hose/cable connecting points on the tractor and trailer in an aligned position, as shown in FIG. 1, is typically much less than when the trailer is at an angle to the tractor, as shown in FIG. 2. The lengths of the hoses and cables are resultantly chosen to accommodate the longest anticipated distance between the connecting points. The hoses and cables consequently have a significant amount of slack when the tractor and trailer are aligned, making them vulnerable to damage. Hose supports have long been used to help prevent the hoses and cables from being damaged as the trailer pivots about its hitch point on the tractor during maneuvering. Hose supports also help protect the hoses and cables both from damage and from damaging the tractor when the tractor is operated without a trailer.

One type of hose support has a rail connected directed to a rear side of the tractor's cab. A spring or a strap is slidably mounted on a first end to the rail. The second end of the strap or spring engages the hoses/cables near their midpoint, suspending them above the truck's frame. During maneuvers tending to tension the hoses/cables, the first end of the strap/spring moves laterally along the rail, allowing the hose/cables to be suspended above the frame of the truck without developing excess tension. This type of support has the disadvantage of communicating undesired vibrations into the cab from road induced movement of the cables, particularly when springs are employed. Another disadvantage is that because the rail at the back of the cab is relatively far from the trailer in some tractor/trailer configurations, the length of the hoses/cables extending beyond the support may be too long for the rail to adequately support the hoses/cables when they are uncoupled from the trailer.

Another mechanism used to support hoses and cables is a post-type device which engages the hoses/cables approximately mid-way between the tractor and trailer and is bendably mounted to the tractor frame on a spring base. The post-type supports mounted to the frame of the truck do not transmit vibrations directly into the cab. The hoses/cables cause the post to bend or pivot relative to its base when the tractor and trailer are at an angle to each other, thereby preventing the development of undesirable levels of tension. When the tractor is again aligned with the trailer, the spring restores the post to an upright position. As with the rail support, when the tractor and the hoses/cables are disconnected from the trailer, they may hang lower than desired, making them potentially vulnerable to being damaged, or to damaging other components.

It is therefore desired to provide a post-type hose support, suitable for mounting to a truck frame, which provides improved tensioning of the hoses/cables to minimize the free length of the hoses/cables when the hoses/cables are not connected to a trailer.

SUMMARY OF THE INVENTION

A hose support for hoses extending from a truck tractor to a truck trailer includes a U-shaped tube, a plurality of balls, a weight, a telescoping member, a hose engagement feature, and a mounting feature. The U-shaped tube has a central axis and two upwardly directed arms. The plurality of balls are disposed within the tube. The weight is slidably disposed in a first arm of the U-shaped tube, and acts against the balls. The telescoping tube is slidably disposed in a second arm. The hose engagement feature is disposed on the telescoping tube. The mounting feature is connected to the U-shaped tube. The weight, acting against the balls, biases the telescoping member upward.

The inventive hose support provides an increased level of support to the hoses/cables when the hoses/cables are not connected to a trailer. This is accomplished by having a constant-force system capable of upwardly biasing the hoses beyond a height associated with having the tractor and trailer aligned.

DETAILED DESCRIPTION OF PREFERRED EMBODIMENTS

Figure 1:
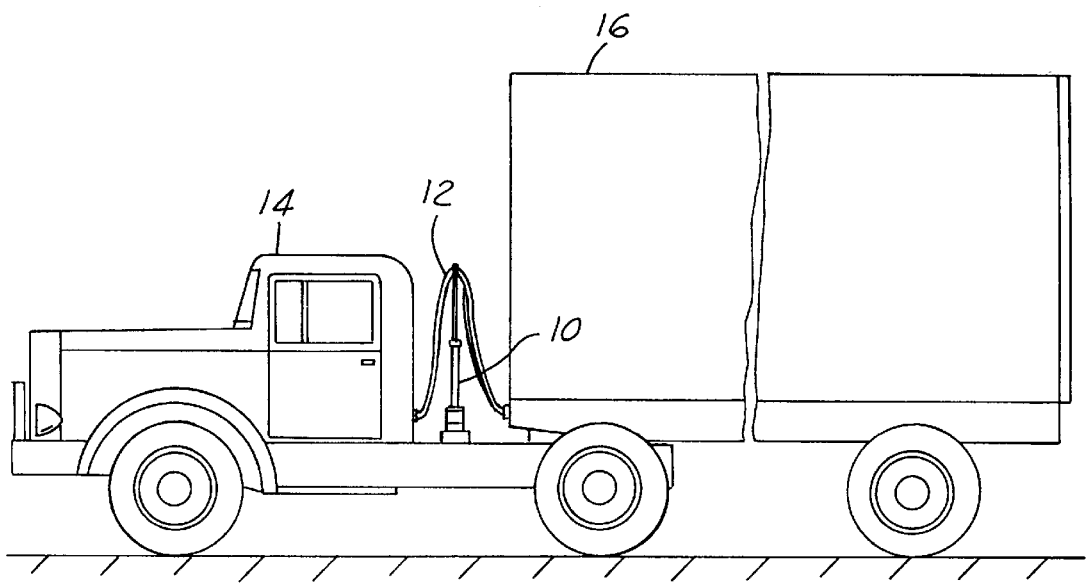
FIG. 1 is a side view of a hose support in use with a truck tractor/trailer.

A hose support assembly 10 is shown in FIG. 1 supporting hoses and cables 12 extending from a truck tractor 14 to a truck trailer 16. For purposes of brevity, instead of referring individually to hoses, cables, tubes and any other flexing members extending from the tractor to the trailer, reference will simply be made to hoses. The hose support assembly 10, as better seen in FIGS. 2 and 3, includes a U-shaped tube 18 with a telescoping tube 20 extending therefrom. A mounting assembly 22 retains U-shaped tube 18 to truck frame 24.

Figure 4:
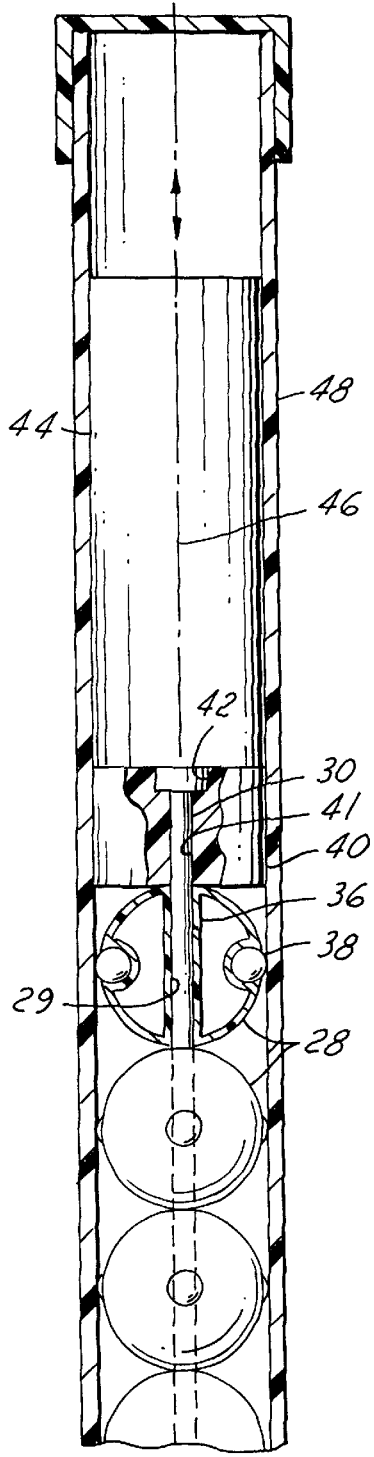
FIG. 4 is a broken-out sectional view of a portion of FIG. 3 in the direction of arrows 4.
Figure 5:
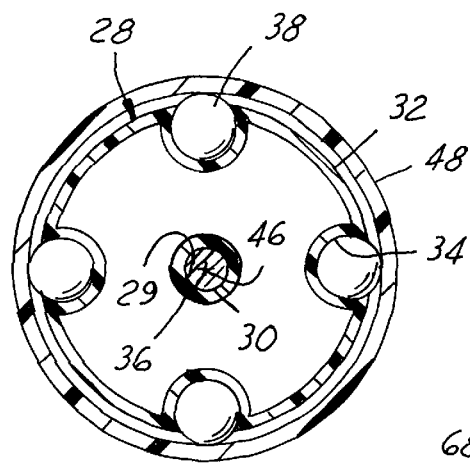
FIG. 5 is a sectional view of the hose support of FIG. 3 taken in the direction of arrow 5.

The U-shaped tube 18, in one preferred embodiment, is formed of plastic, with an inside diameter of 2.035 inches, and an outside diameter of 2.375 inches. Twenty-four roller ball assemblies 28, the details of which are best shown in FIGS. 4 and 5, are slidably disposed within tube 18. A center aperture 29 accommodates a 3/16 inch diameter elastomeric rubber cord 30 used to link balls 28 together. Roller ball assemblies 28 each have a hollow ball portion 32. 1¾ inches in diameter, with a ⅛ inch thick wall. The hollow ball portions 32 have four roller pockets 34 evenly spaced around a sleeve 36 defining aperture 29 and concentric with a center axis 37. A ⅜ inch solid plastic roller ball 38 is disposed in each of the roller pockets 34. The outside diameter of the roller ball assembly 28 is 2 inches. As a lower cost alternative, 2 inch diameter balls (not shown) without rollers could be used, but they would sustain friction loads of greater magnitude. At each end of the chain of balls 28 is an end piece 40. The end pieces 40 are 2 inches in outside diameter, and having an aperture 41 receiving the cord and a bore 42 receiving an enlarged end of cord 30, as provided by a knot at an end of cord 30 or the like.

A cylindrical biasing weight 44, 5 inches long and 2 inches in diameter, engages one of end pieces 40, while the other end piece 40 is engaged by telescoping tube 20.

U-shaped tube 18, which receives biasing weight 44, as well as balls 28 and telescoping tube 20, is formed of plastic, and extends along a central axis 46. Cord 30 maintains the axes 36 of ball assemblies 28 in alignment with axis 46.

A biasing side 48 of tube 18 has biasing weight 44 slidably disposed therein. A telescoping side 50 is shorter than biasing side 48, and has telescoping tube 20 slidably disposed therein. The relative length of 48 and 50 is controlled in part by factor such as the amount of mass needed to provide the desired bias, the density of the biasing weight and the range of height adjustments to be provided by the support assembly 10. Typically, side 48 will be longer than side 50. A radius portion 52 provides an inner radius of 1.5 inches in a preferred embodiment. It should be appreciated that the drawings are not precisely to scale and that the preferred embodiment would therefore have fewer ball assemblies 28 in the radius portion 52 than shown in the figures.

A tube lateral stabilizer 54 extends 5 inches from center to center of sides 48 and 50. A retainer strap 56 helps hold stabilizer 54 in place.

A biasing side end cap 58 prevents contaminants from entering an upper end of biasing side 48. A telescoping side end cap 60 has an inside diameter of approximately 1.5 inches to provide a close fitting relationship to the telescoping tube outside diameter. Telescoping side end cap 60 acts an upper bearing to support telescoping tube 20. A lip seal or the like could also be placed at end cap 60 to prevent the entry of contaminants into the telescoping side 50 of tube 18.

Telescoping tube 20 is comprised principally of an elongated tube member 62, 32 inches long and with an outside diameter of 1.5 inches. A lower cap 64 is disposed over an end of elongated tube member 62, and has an outside diameter of approximately 2 inches which acts as a lower bearing for telescoping tube 20. An upper cap 66 over the top of telescoping tube 20 helps prevent contaminants from entering U-shaped tube 18. It may also be desirable, in some applications, to employ a sleeve (not shown) of the same outside diameter as lower cap 64 at a point midway between lower cap 64 and an upper cap 66 to both provide extra bearing support. Such a sleeve would prevent over-travel of telescoping tube 20, and thereby minimize the opportunity of telescoping tube 20 to tip relative to U-shaped tube 18. Two hose rings 68 are disposed on opposite sides of upper cap 66. Hose rings 68 are approximately 1 inch wide (long) and 2 inches in outer diameter. A ¼ inch by 2½ inch bolt 70 and a nut 72 retain cap 66 and rings 68 to tube member 62.

Figure 6:
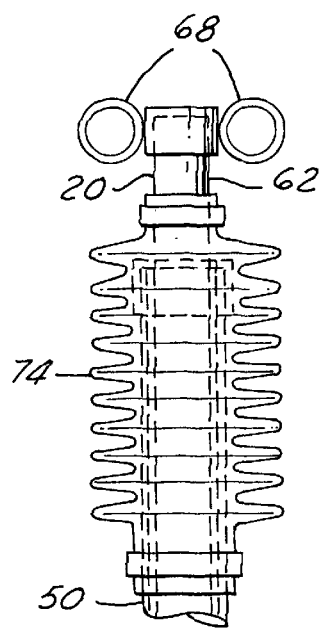
FIG. 6 is a view of a telescoping end of the support in a fully depressed position.
Figure 7:
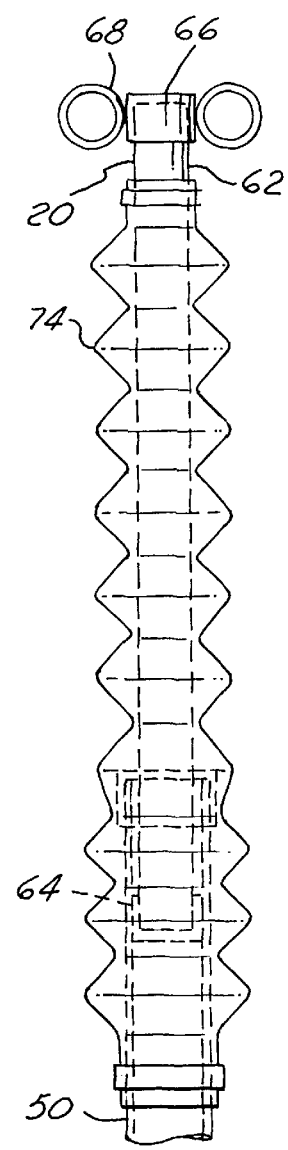
FIG. 7 is a picture of the telescoping member of FIG. 6 in a fully extended position.

A sealing bellows 74, as best shown in FIGS. 6 and 7, may be disposed over an upper end of telescoping side 50 and telescoping tube 20 to prevent contaminants from entering U-shaped tube 18. Bellows 74 is formed of a resilient elastomer which remains tough yet flexible over a wide range of temperatures. Bellows 74 also induces a minimal amount of upward bias when it is compressed as shown in FIG. 6.

Mounting assembly 22 includes a mounting plate 76 which is mounted directly to truck frame 24 when hose support assembly 10 is installed on a truck tractor 14. A U-shaped support member 78 includes a C-shaped lower portion 80 formed of steel and two V-shaped side portions 82, also formed of steel. Four ¼ inch-20 threaded apertures 83 are formed in each of side portions 82. Apertures 83 receive threaded bolts 86 from C-clamps 84. Each C-clamp 84 is 1 inch wide by 1½ inches deep with a 1³⁄₁₆ inch radius and ½ inch wall thickness at the center of the radiused portion. Eight ¼-20 by 3¾ inch bolts 86 are used to mount the C-clamps to retain U-shaped tube 18 to U-shaped support member 78. A rubber mount or shock absorber 88 connects mounting plate 76 with U-shaped support members 78. Rubber mount 88 is provided with eight ¹⁷⁄₆₄ inch apertures 90 to receive an equal number of ¼–20 bolts 92 fixing rubber mount 88 to both mounting plate 76 and U-shaped support member 78.

The invention operates in the following manner. When the truck tractor 14 and trailer 16 are in an aligned position, as shown in FIG. 1, the distance between connecting points for the hoses and cables 12 is at a minimum. A force provided by biasing weight 44 is transferred through balls 28, which are kept in alignment by cord 30, to telescoping tube 20. The downward force on end piece 40 induced by biasing weight 44 is approximately equal to the upward force provided by the other end piece 40 acting against telescoping side 50. It is appreciated that there would be some loss of force transferred, due to frictional forces, particularly in the radiused area 52. It is anticipated that frictional losses would be less for embodiments employing roller ball assemblies 28 than for plain or standard balls without roller balls 38. When the upward force at end piece 40 in arm 50 equals the reactive force of the hoses/cables and the weight of the tube 20, telescoping tube 20 comes to rest. Hose support assembly 10 advantageously provides a substantially constant upward bias independent of the vertical position of telescoping tube 20 and hose rings 68. The force will vary slightly as roller ball assemblies 28 move from one side of the tube to the other. Balls in arm 48 contribute to the upward bias, while balls in arm 50 decrease the upward bias force. The benefit of using lightweight plastic roller ball assemblies 28 is readily apparent. Light assemblies 28 minimize the effect on the biasing force of the ball assemblies 28 shifting from side to side. This is contrasted with the upward bias provided by a spring system which will vary significantly with the amount of deflection induced in the spring. Straining the hoses during turning maneuvers may result if the force required to displace the telescoping tube 20 downward is too high. But, if the upward bias force is too low, the hoses 12 will not have sufficient support to prevent them from becoming pinched or damaged during articulation of the trailer. Therefore, a consistent bias force is very beneficial.

Figure 2:
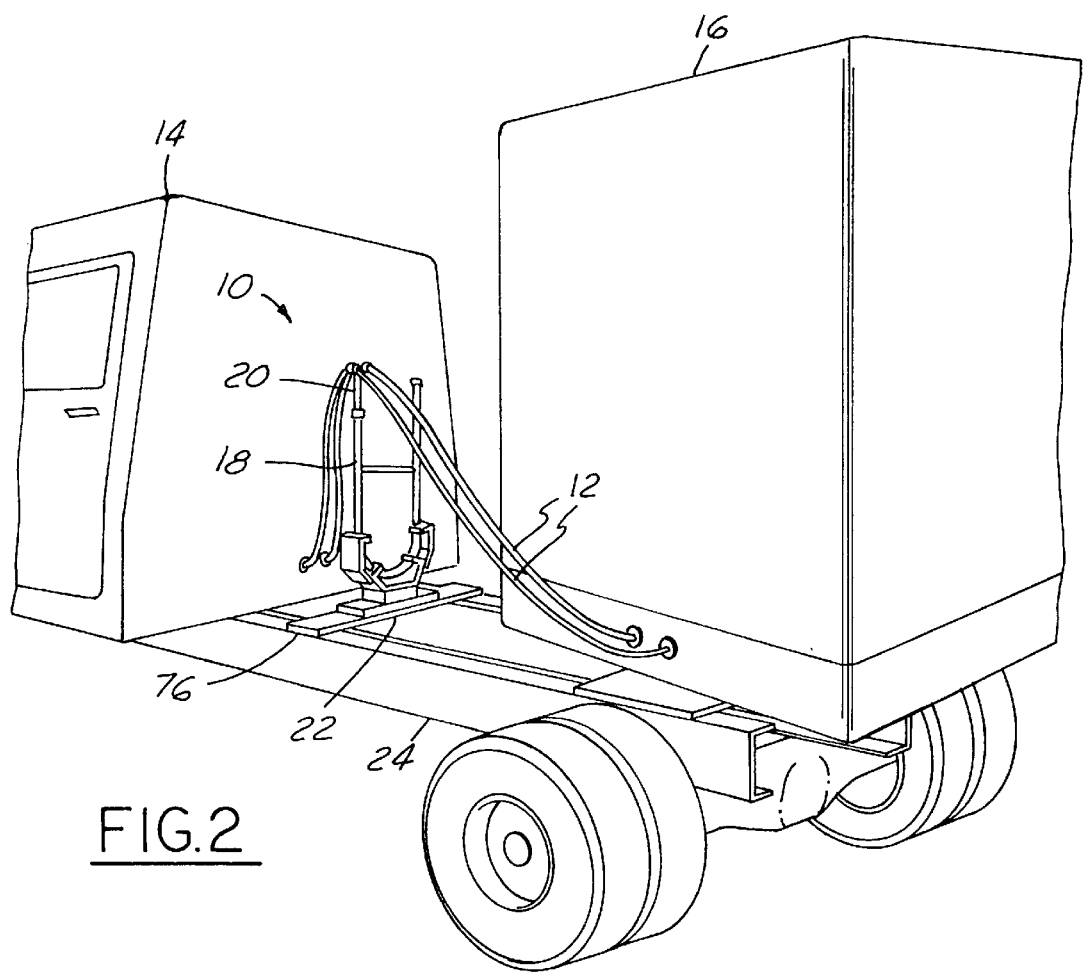
FIG. 2 is a perspective view of the hose support with the trailer pivoted at an angle to the tractor.
Figure 3:
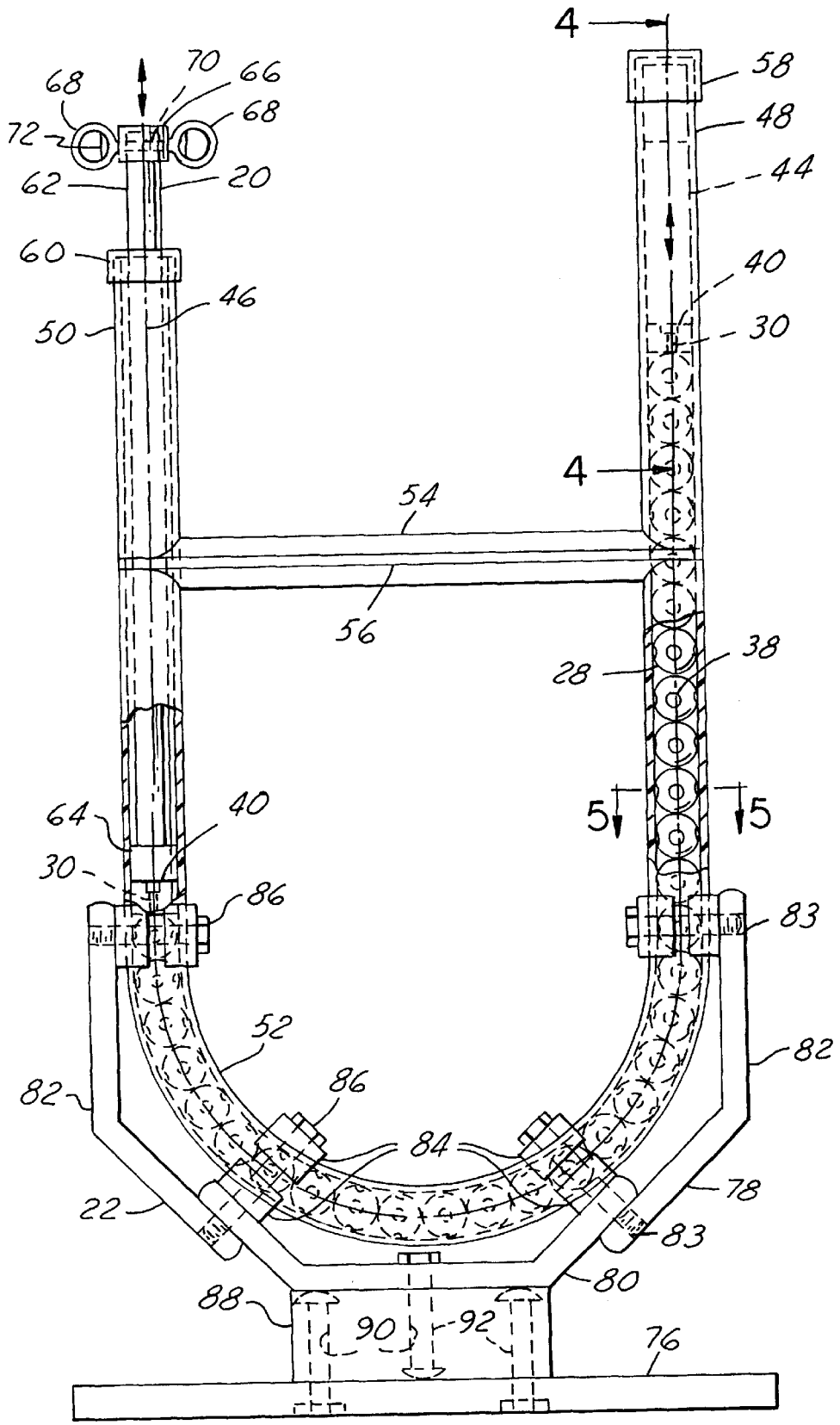
FIG. 3 is a rear view of the hose support.

In the present invention, the weight of biasing weight 44 is optimized so that as the trailer pivots as shown in FIG. 2, the increase in hose tension induced by the increased distance between the connection points is sufficient to displace biasing weight 44 upward within biasing side 48 of U-shaped tube 18.

When hoses/cables 12 are disconnected from trailer 16 (not shown), telescoping tube 20 biases them upward to a position higher than that shown in FIG. 1. This provides additional protection of hoses/cables 12 from damage during operation without trailer 16.

The rubber mount 88 of mounting assembly 22 greatly reduces the vibrations transmitted into the cab attributable to movement of hoses by absorbing much of the vibration. Rubber mount 80 is also sufficiently elastic so that the upper part of assembly 10 including U-shaped tube 18 is able to bow relative to mounting plate 76 if horizontal forces in the hoses 12 on the telescoping tube 20 are sufficiently high.

It should be appreciated that various modifications and changes may be made to the described embodiments. For instance, U-shaped support member 78 could be formed as a single piece. Also, it may be possible to forego the use of mounting plate 78 if an appropriate cross member already exists in truck frame 24. Further, the precise means used to provide bearing support for telescoping tube 20 can be varied. For instance, lower cap 64 of telescoping tube 20 can be either a closed end cap or a sleeve. Alternative configurations for rubber mount 88 could be employed. For example, a structure similar to that employed with engine mounts could be adapted for use in this application. Also, the specific dimensions of the components recited may be varied according to the specific dimensional requirements of the vehicle application for which the hose support assembly is intended.

I claim:

1. A hose support for hoses extending from a truck tractor to a truck trailer, the hose support comprising:
   - a U-shaped tube having a central axis and two upwardly directed arms;
   - a plurality of balls disposed within the tube;
   - a weight slidably disposed in a first arm of the U-shaped portion acting against the balls;
   - a telescoping member slidably disposed in a second arm of the U-shaped tube acting against the balls;
   - a hose engagement feature disposed on the telescoping member; and
   - a mounting feature connected to the U-shaped tube wherein the weight acting against the balls biases the telescoping member upward.

2. A hose support as claimed in claim 1, wherein there are two cylindrical end pieces, with one disposed at each end of the balls.

3. The hose support as claimed in claim 1, further comprising a flexible cord passing through the balls along an axis of the balls connecting the balls and maintaining the balls in approximate alignment with the central axis of U-shaped tube.

4. The hose support as claimed in claim 3, wherein each of the balls has a plurality of roller pockets and a roller ball disposed in each of the roller pockets, the roller balls being located for engagement with an inside of the U-shaped tube.

5. The hose support as claimed in claim 1, wherein the U-shaped tube is connected to a resilient mounting member.

6. The hose support as claimed in claim 5, wherein the resilient mounting member is formed of an elastomer.

7. The hose support as claimed in claim 5, wherein the resilient mounting member is fixed on one side to the U-shaped tube and on a second side to a mounting plate.

8. The hose support as claimed in claim 1, wherein a sealing bellows is disposed between the telescoping member and the second arm of the U-shaped tube.

9. The hose support as claimed in claim 8, wherein a sealing cap is disposed over an end of the first arm of the tube.

\* \* \* \* \*